United States Patent [19]
Bull

[11] 3,744,229
[45] July 10, 1973

[54] SHRUB RAKE

[76] Inventor: Arthur E. Bull, 8089 Midland Road, Mentor, Ohio 44060

[22] Filed: May 17, 1972

[21] Appl. No.: 254,039

[52] U.S. Cl. .......................................... 56/400.17
[51] Int. Cl. ............................................ A01d 7/06
[58] Field of Search ................... 56/400.2, 400.21, 56/400.19, 400.17, 400.18

[56] References Cited
UNITED STATES PATENTS

| 2,302,541 | 11/1942 | Fuller | 56/400.17 |
| 2,095,693 | 10/1937 | Fuller | 56/400.17 |
| 2,234,865 | 3/1941 | Jenkins | 56/400.17 |
| 2,456,876 | 12/1948 | Keller et al. | 56/400.17 |

FOREIGN PATENTS OR APPLICATIONS

| 12,061 | 7/1903 | Norway | 56/400.21 |

*Primary Examiner*—Antonio F. Guida
*Attorney*—Robert J. Fay

[57] ABSTRACT

An improved rake especially suited for use in raking among shrubbery is provided. The rake comprises a support means having handle means extending from the support means for manipulation of the rake. A plurality of elongated, generally resilient, spaced apart tines having a first end adapted for raking and a second end, are slidably carried by the support means. The first end of the tines is spaced apart from the support assembly. The rake also includes biasing means for maintaining the tines biased in an outward direction from the support assembly so that, if one of the tines strikes an object during raking, the tine can retract in opposition to the biasing means and the striking of the object does not interfere with the raking action of the remaining tines. When the tine is disengaged from the object such as a stalk of a bush, the biasing means causes the tine to return to its original outward position.

16 Claims, 6 Drawing Figures

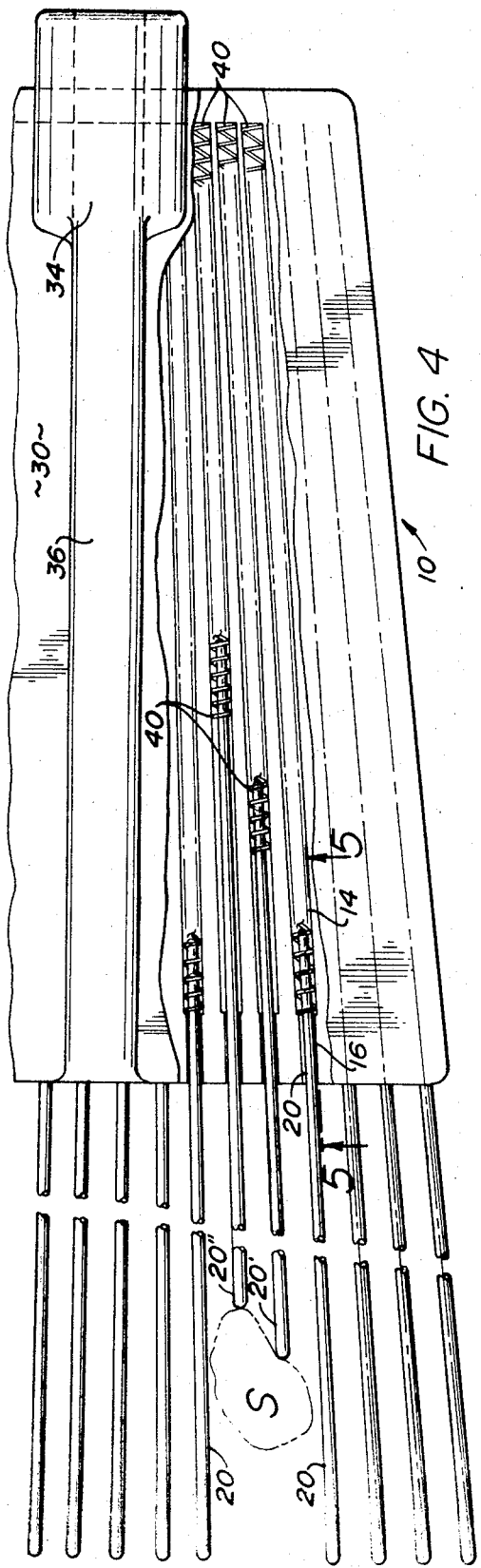
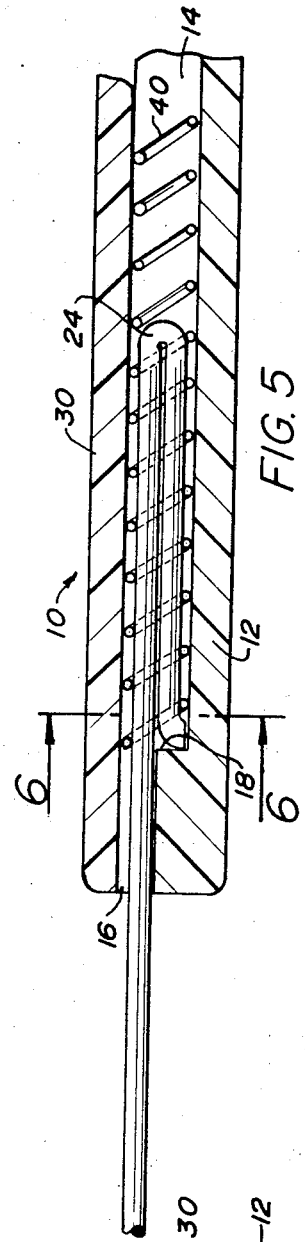
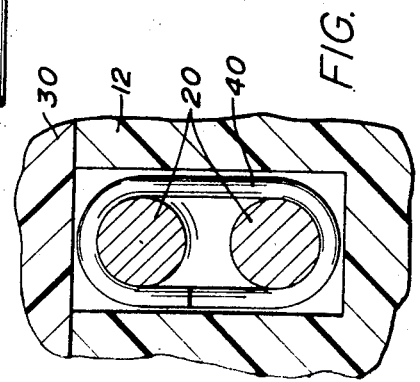

SHRUB RAKE

This invention relates generally to rakes and more particularly to tine rakes of the type used for raking among shrubbery.

The conventional type of tine rake now in use is illustrated in the patent issued to Withington, Re 17,606 for a "Broom Rake." The tines are generally flat metal members arranged to diverge from the anchoring means attached to the handle. For best results, the use of this type of rake is limited to raking such material as cut grass and leaves, where the tines do not come into contact with more rigid objects such as stems and stalks of bushes or shrubs. It is particularly difficult when raking among shrubbery to rake foreign matter out of all parts of the shrub, using this type of rake since stiff branches may prevent the gardener from getting the rake far enough into the shrub.

A different configuration of rake is illustrated in U. S. Pat. No. 1,628,994, issued to Orren for a "Rake." This device is aimed at the problem of raking over uneven surfaces and the individual tines are pivoted at their mounting ends and spring-biased by tension springs so that the ends of one or more tines may travel up over an uneven surface or a foreign object, and the tine will then be returned to its original position by the spring member. However, this device is equally inappropriate for raking among shrubbery where the tines may be subjected to longitudinal forces resulting from striking the stalk or branch of the shrub, with the end of the tine, thereby impeding the raking action of the remaining tines.

Therefore, in accordance with a primary aspect of the present invention, an improved rake especially suited for use in raking among shrubbery is provided. The rake comprises a support means having handle means extending from the support means for manipulation of the rake. A plurality of elongated, generally resilient, spaced apart tines having a first end adapted for raking and a second end, are slidably carried by the support means. The first end of the tines is spaced apart from the support assembly. The rake also includes biasing means for maintaining the tines biased in an outward direction from the support assembly so that, if one of the tines strikes an object during raking, the tine can retract in opposition to the biasing means and the striking of the object does not interfere with the raking action of the remaining tines. When the tine is disengaged from the object such as a stalk of a bush, the biasing means causes the tine to return to its original outward position.

In accordance with a more limited aspect of the present invention, an improved rake is provided wherein the biasing means comprise a plurality of helical spring members enclosed within the support assembly so that the branches of the shrub cannot become tangled among the spring members.

In accordance with another aspect of the present invention, the tines of the improved rake include end portions having a 180° bend. This doubled-over portion is tightly enclosed by the biasing means which are helical compression spring members having a generally oval cross-section received and retained by elongated grooves in the housing assembly. The subject embodiment thus provides a rake which may have, in addition to the support assembly and handle means, only the plurality of tines and an equal number of helical spring members.

Accordingly, a primary object of the present invention is to provide a rake especially suited for raking among shrubbery, but which is equally appropriate for raking such material as leaves and grass, and which is exceedingly simple, has very few parts, and is therefore inexpensive to manufacture.

It is also an object of the present invention to provide a rake having individually spring biased tines, such that, when raking among shrubbery if one of the tines comes in contact with a branch or stalk, the tine can retract longitudinally into the support assembly, thereby permitting the remaining tines to continue their raking action.

It is a further object of the present invention to provide a rake having a minimum of sharp corners and edges and projecting elements with which the branches of a shrub can become entangled.

Other objects and advantages of the invention will become apparent upon reading the following detailed description and upon reference to the drawings in which:

FIG. 4 is a partial cross-section taken on line 4—4 of FIG. 3 and on a larger scale than FIG. 3;

FIG. 5 is also a partial cross-section, taken on line 5—5 of FIG. 4 and on a larger scale than FIG. 4;

FIG. 6 is a partial cross-section taken on line 6—6 of FIG. 5, and on a larger scale than FIG. 5.

Figure 1:
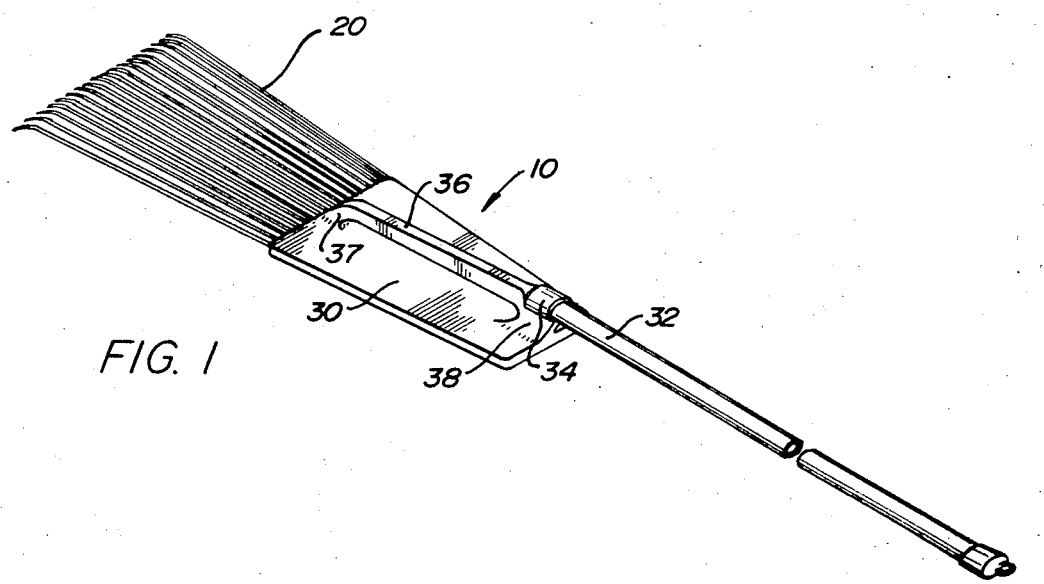
FIG. 1 is a perspective view of the preferred embodiment of the rake of the present invention.
Figure 3:
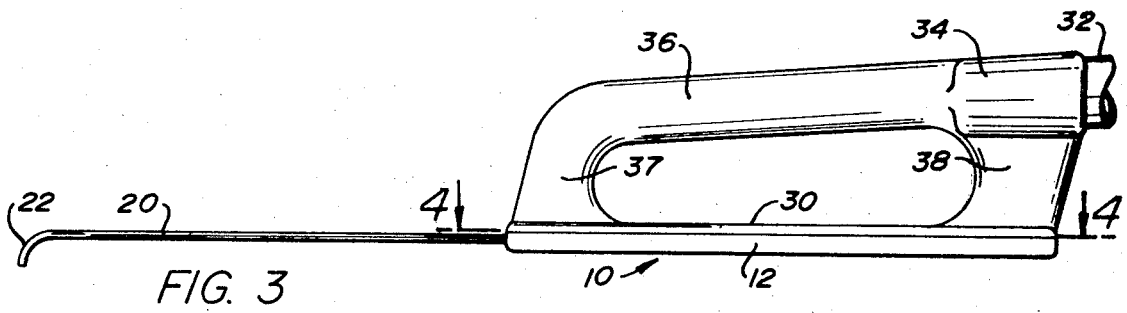
FIG. 3 is a side elevation of the rake.

Referring specifically to the drawings which are only for the purpose of illustrating preferred embodiments of the invention and not for the purpose of limiting the same, FIG. 1 is a perspective of the rake of the present invention. The rake is generally illustrated as having a support assembly 10 which may be of unitary construction, or may include, as is best shown in FIGS. 3 and 5, a base member 12 and a cover member 30. The base and cover may be joined by any appropriate means such as by bonding or by screws. They may also be joined so as to be readily separable for purposes of replacing damaged tines or springs. The primary function of the support assembly 10 is to slidably carry the tines 20 which include an arcuate end portion 22 adapted for raking, as is best shown in FIG. 3. The arcuate end portion, in addition to being well-adapted for raking, also minimizes the possibility of the end of the tine bruising or otherwise damaging a branch or stalk. The tines are illustrated as diverging slightly away from the support assembly, but it should be understood that they may be oriented substantially parallel, or may diverge to a greater degree.

A secondary purpose of the support assembly 10 is to provide manipulating means which, in the preferred embodiment, includes a handle member 32 located within a cylindrical receiving portion 34 rigidly attached to cover member 30. In addition, for ease of manipulation, a gripping member 36 is provided which is spaced apart from cover member 30 by end portions 37 and 38 of gripping member 36. While the cover member 30 and the associated gripping member 36 and handle mounting portion 34 are shown as an integral molded plastic piece, it should be appreciated that the general configuration illustrated can be achieved through various other appropriate materials and forming processes.

Returning now to the support assembly 10, it can be seen by reference to FIGS. 4 and 5 that the base member 12 defines a series of elongated grooves which include a larger groove portion 14 and a second groove portion 16 having a reduced cross-section. The end wall of the groove 14 defines a stop surface 18, thereby restricting the longitudinal movement of the tine 20 in a direction outward from the support assembly 10 as best shown in FIG. 5. It should be apparent that the groove portions could, within the spirit of the present invention, be formed in the cover member instead of in the base member, or could even extend through a unitary support assembly.

Figure 2:
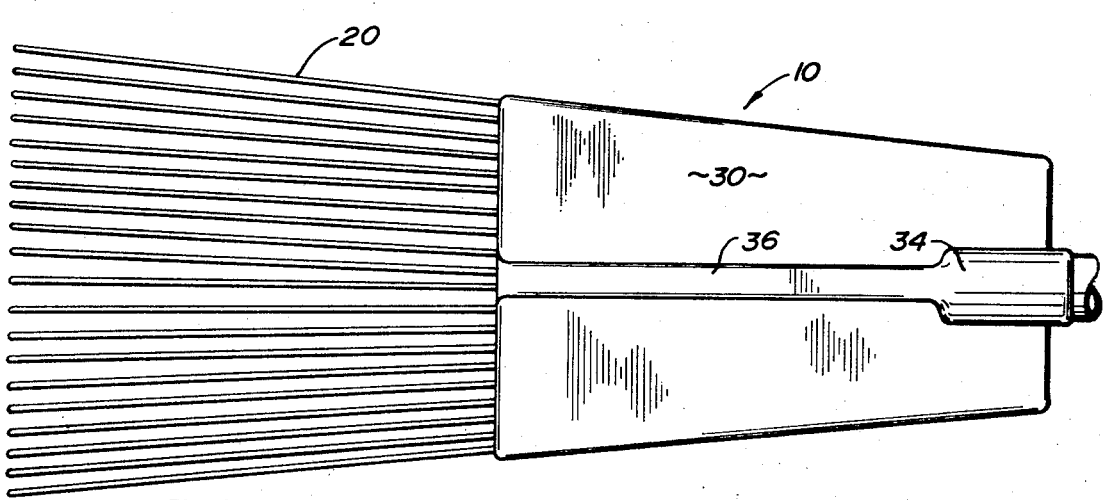
FIG. 2 is a plan view on a larger scale than FIG. 1.

It should be noted that in the subject embodiment the support assembly has a minimum of sharp corners and edges on which branches of the shrub are likely to catch. In addition, the combination of the support assembly and the tines, as can best be seen in FIG. 2, is tapered toward the handle end, so that as the rake is being removed from a shrub it it less likely to hang-up among the branches.

The tines 20 are outwardly biased by spring members 40 which are shown in FIGS. 5 and 6 as helical compression spring members, but it should be clearly understood that the biasing means could comprise any appropriate arrangement of tension springs, compression springs, flat springs or any other elements which can serve the function of maintaining the tines biased outwardly as shown. The spring members of the subject embodiment are shown as enclosed within the support assembly 10 so that there are no unnecessary projections from the support assembly which could become tangled with the branches. More particularly, the end portion of the tine 20 has a 180° bend 24, thus providing a doubled-over portion of the tine which is slidingly seated within the spring member 40, thus requiring only one part, the spring, to locate, retain, and bias the tine. As shown in FIG. 4, the spring member 40 is seated against an end wall of base member 12 near the handle mounting portion 34.

The actual operation of the present invention during raking is best shown in FIG. 4 in which two of the tines 20' and 20'' have engaged a rigid object S such as a stalk of a bush. It should be noted that the remaining tines 20 are still fully extended outward and therefore capable of continuing their raking action, while the tines 20' and 20'', engaged with stalk S have been forced to retract into the support assembly in opposition to the force of the spring means 40. When tines 20' and 20'' are subsequently disengaged from stalk S, they will return to the original position enjoyed by the remaining springs 20.

While the invention has been described in conjunction with specific embodiments thereof, it is evident that many alternatives and modifications will be apparent to those skilled in the art in light of the foregoing description. Accordingly, it is intended to embrace all such alternatives and modifications as fall within the spirit and scope of the appended claims.

What is claimed is:

1. A rake especially suited for use in raking among shrubbery, said rake comprising:
   a support means having handle means extending therefrom for manual manipulation of said rake;
   a plurality of elongated, generally resilient, spaced apart tines having a first end adapted for raking and a second end, said tines being slidably carried by said support means for selective movement in a direction generally longitudinally of themselves, said first end of said tines being spaced apart from said support assembly; and,
   biasing means for continuously biasing said tines toward a normally outwardly extending position from said support means, said tines being independently retractable from said normal position into said support means against the force of said biasing means when said tines strike an object, said biasing means forcing said tines back into said normal position when said tines are disengaged from said object, whereby the striking of an object does not interfere with the raking action.

2. The rake of claim 1 wherein said biasing means comprises spring means.

3. The rake of claim 2 wherein said spring means are helical spring members.

4. The rake of claim 3 wherein said biasing means are enclosed within said support means.

5. The rake of claim 1 wherein said support means defines a plurality of elongated, longitudinal grooves for receiving said tines.

6. The rake of claim 5 wherein said elongated grooves include a first groove portion to receive one of said biasing means, and a second groove portion of reduced cross-section for slidably locating one of said tines therein.

7. The rake of claim 1 wherein said support means includes a base member and a cover member.

8. The rake of claim 7 wherein said base member defines a plurality of elongated, longitudinal grooves for receiving said tines.

9. The rake of claim 1 wherein said handle means comprises an elongated handle member rigidly mounted on said support means and extending longitudinally therefrom.

10. The rake of claim 9 wherein said handle means includes an elongated gripping member having end portions fixedly attached to said support means, said gripping member spaced apart from said support means.

11. The rake of claim 1 wherein said tines divergingly extend from said support assembly and have a substantially circular cross-section.

12. The rake of claim 11 wherein the first end of said tines comprises an arcuate portion, adapted for raking.

13. The rake of claim 1 wherein said second end of said tine engages said biasing means.

14. The rake of claim 13 wherein said second end of said tines includes projecting stop means, and said biasing means encloses said second end of said tine and maintains engagement with said stop means.

15. The rake of claim 14 wherein said second end of said tine includes a bend in said tine of approximately 180°, and said bent portion is in sliding engagement with said biasing means.

16. The rake of claim 1 wherein said support means is generally tapered away from said tines so as to be easily removable from a shrub.

* * * * *